United States Patent
Holzheimer

(10) Patent No.: US 9,716,322 B2
(45) Date of Patent: Jul. 25, 2017

(54) MULTI-POLARIZATION ANTENNA ARRAY FOR SIGNAL DETECTION AND AOA

(71) Applicant: Raytheon Company, Waltham, MA (US)

(72) Inventor: Timothy R. Holzheimer, Rockwall, TX (US)

(73) Assignee: Raytheon Company, Waltham, MA (US)

( * ) Notice: Subject to any disclaimer, the term of this patent is extended or adjusted under 35 U.S.C. 154(b) by 1181 days.

(21) Appl. No.: 13/754,108

(22) Filed: Jan. 30, 2013

(65) Prior Publication Data

US 2014/0035781 A1    Feb. 6, 2014

Related U.S. Application Data

(60) Provisional application No. 61/678,938, filed on Aug. 2, 2012.

(51) Int. Cl.
| | | |
|---|---|---|
| *H01Q 21/24* | (2006.01) | |
| *G01S 3/50* | (2006.01) | |
| *H01Q 1/28* | (2006.01) | |
| *H01Q 21/08* | (2006.01) | |
| *H01Q 21/20* | (2006.01) | |

(52) U.S. Cl.
CPC ........... *H01Q 21/24* (2013.01); *G01S 3/50* (2013.01); *H01Q 1/286* (2013.01); *H01Q 21/08* (2013.01); *H01Q 21/205* (2013.01)

(58) Field of Classification Search
CPC ...... H01Q 1/286; H01Q 21/24–21/245; H01Q 21/28; G01S 3/50
See application file for complete search history.

(56) References Cited

U.S. PATENT DOCUMENTS

| | | | | |
|---|---|---|---|---|
| 3,697,998 A | * | 10/1972 | Schaufelberger | H01Q 3/245 342/368 |
| 6,049,705 A | * | 4/2000 | Xue | H04B 7/10 455/277.1 |
| 6,356,241 B1 | | 3/2002 | Jaeger et al. | |
| 6,459,903 B1 | * | 10/2002 | Lee | H04W 64/00 342/457 |
| 2004/0116085 A1 | * | 6/2004 | Son | H04B 1/30 455/130 |

(Continued)

OTHER PUBLICATIONS

J.A. Meyer et al., Plasma properties determined with induction loop probes in a planar inductively coupled plasma source, J. Appl. Phys. 79(3), p. 1298-1302, Feb. 1996.*

(Continued)

*Primary Examiner* — Bernarr Gregory
*Assistant Examiner* — Fred H Mull
(74) *Attorney, Agent, or Firm* — Daly, Crowley, Mofford & Durkee, LLP

(57) ABSTRACT

A multi-polarization radio frequency (RF) antenna includes an array of impulse sensors that are capable of detecting RF signals within a surrounding environment. In some embodiments, antennas are provided for use within the high frequency (HF) band. The array of impulse sensors may include, for example, one or more B-dot sensors and/or one or more D-dot sensors. Various different antenna configurations are provided that are capable of operation with multiple different polarizations.

31 Claims, 9 Drawing Sheets

(56) References Cited

U.S. PATENT DOCUMENTS

| | | | |
|---|---|---|---|
| 2006/0066304 A1* | 3/2006 | Schill, Jr. | G01R 29/0878 |
| | | | 324/258 |
| 2009/0072921 A1* | 3/2009 | Schmid | H04L 27/361 |
| | | | 332/145 |
| 2010/0033709 A1* | 2/2010 | Lampin | H01Q 1/38 |
| | | | 356/51 |
| 2010/0227646 A1* | 9/2010 | Ogawa | H01Q 1/246 |
| | | | 455/562.1 |
| 2011/0235728 A1* | 9/2011 | Karabinis | H04L 5/0007 |
| | | | 375/260 |

OTHER PUBLICATIONS

K.-C. Huang et al., Millimetre Wave Antennas for Gigabit Wireless Communications, John Wiley and Sons, Ltd., p. 56-58, 2008.*
C.E. Baum, Tiny Fast-Pulse B-Dot and D-Dot Sensors in Dielectric Media, Sensor and Simulation Notes, Note 544, p. 1-9, Jun. 2009.*
Some. (2011). The American Heritage Dictionary of the English Language. Boston, MA: Houghton Mifflin. Retrieved from http://search.credoreference.com/content/entry/hmdictenglang/some/0.*
T.F. Trost et al., Transient electromagnetic fields on a delta-wing aircraft model with injected currents, Proceedings of the International Aerospace Conference on Lightning and Static Electricity, Oxford, England, vol. 1, p. D5-1 to D5-7, Mar. 1982.*
J. Grando et al., Comparison of Experimental and Numerical Results for Transient Electromagnetic Fields Induced on a Scale Model Aircraft by Current Injection Technique, Antennas and Propagation Society International Symposium, p. 1751-1754, 1989.*
Interleave. (2001). Hargrave's Communications Dictionary . Hoboken, NJ: Wiley. Retrieved from http://search.credoreference.com/content/entry/hargravecomms/interleave/0.*
J. Rai et al., Horizontally and vertically polarized components of lightning electric fields, Proceedings of the 19th International Lightning Detection Conference, p. 1-8, Apr. 2006.*
T. C.Wagoner et al., Differential-output B-dot and D-dot monitors for current and voltage measurements on a 20-MA, 3-MV pulsed-power accelerator, Physical Review Special Topics—Accelerators and Beams, vol. 11, p. 100401-1 to 100401-18, 2008.*
C.T. Mata et al., A New Comprehensive Lightning Instrumentation System for Pad 39B at the Kennedy Space Center, Florida, International Conference on Lightning Protection (ICLP), p. 1-7, 2010.*
E.K. Miller et al., Direct Time-Domain Techniques for Transient Radiation and Scattering, Lawrence Livermore Laboratory Report UCRL-52315, 1976.*
F.A. Fisher et al., Lightning Protection of Aircraft, NASA Reference Publication 1008, 1977.*
C.E. Baum et al., Sensors for Electromagnetic Pulse Measurements Both Inside and Away from Nuclear Source Regions, IEEE Transactions on Antennas and Propagation, vol. AP-26(1), p. 22-35, Jan. 1978.*
Baum; "Monitor for Integrity of Doors in a Shield Enclosure;" Measurement Notes; Note 36; Air Force Weapons Laboratory; Nov. 25, 2987; 16 pages.
Baum, et al.; "Review of Impulse-Radiating Antennas;" Ch. 16; W.R. Stone (ed); Review of Radio Science 1996-1999; Oxford U. Press, Jan. 1999; pp. 403-438.
Farr; "A Two-Channel Balanced-Dipole Antenna (BDA) With Reversible Antenna Pattern Operating at 50 Ohms;" Sensor and Simulation Notes; Note 441; Air Force Research Laboratory; Dec. 1999; 15 pages.
Gibson; "Slab Coupled Optical Fiber Sensor for Electric Field;" Sensing Applications; Dissertation; Department of Electrical and Computer Engineering; Brigham Young Univeresity; Dec. 2009; 145 pages.
Hardin; "Magnetic Field Generation and B-Dot Sensor Characterization in the High Frequency Band;" Thesis; Department of the Air Force Air University; Air Force Institute of Technology; Mar. 2012; 111 pages.
Hardin; "Magnetic Field Generation and B Dot Sensor Characterization in the High Frequency Band;" Air Force Institute of Technology; Presentation; Feb. 23, 2012, 47 pages.
Holzheimer, et al.; "HF Arrays—Via the Impulse Community;" Presentation; Raytheon; Oct. 17, 2013; 21 pages.
Olsen; MGL-S8(R) B-Dot Sensor Development; AFWL-TR-75-252 Final Report; Air Force Weapons Laboratory; Apr. 1976; 45 pages.
Tesche; "The PxM Antenna and Applications to Radiated Field Testing of Elecetrical Systems;" Part-1; Theory and Numerical Simulations; Sensor and Simulation Notes; Note 407; Jul. 10, 1997; 57 pages.
Web Page—Plasma Diagnostics; http://pepl.engin.umich.edu/diagnostics/b-dot.html; Jan. 30, 2013.
Web Page—ACD D-Dot Sensor (Free Field); http://www2.urscorp.com/albuquerque/ACD-D-Dot-datasht.htm; Jan. 30, 2013.
Web Page—HSD D Sensors (Free Field); http://www2.urscorp.com/albuquerque/hsd_d_sensor—datasht.htm; Jan. 30, 2013.
Web Page; HSD ($q_s$) Sensors; http://www2.urscorp.com/albuquerque/HSD-ShortBasePlate-datasht.htm; Jan. 30, 2013.
Web Page; MGL Surface Current (j) Sensors; http://www2.urscorp.com/albuquerque/mgl_surface_current datasht.htm; Jan. 30, 2013.
Web Page; Magnetic Field Sensor (B) (Free Field) Model B-10 (A or R); http://prodyntech.com/home/page/model_b_1_; Jan. 30, 2013.

* cited by examiner

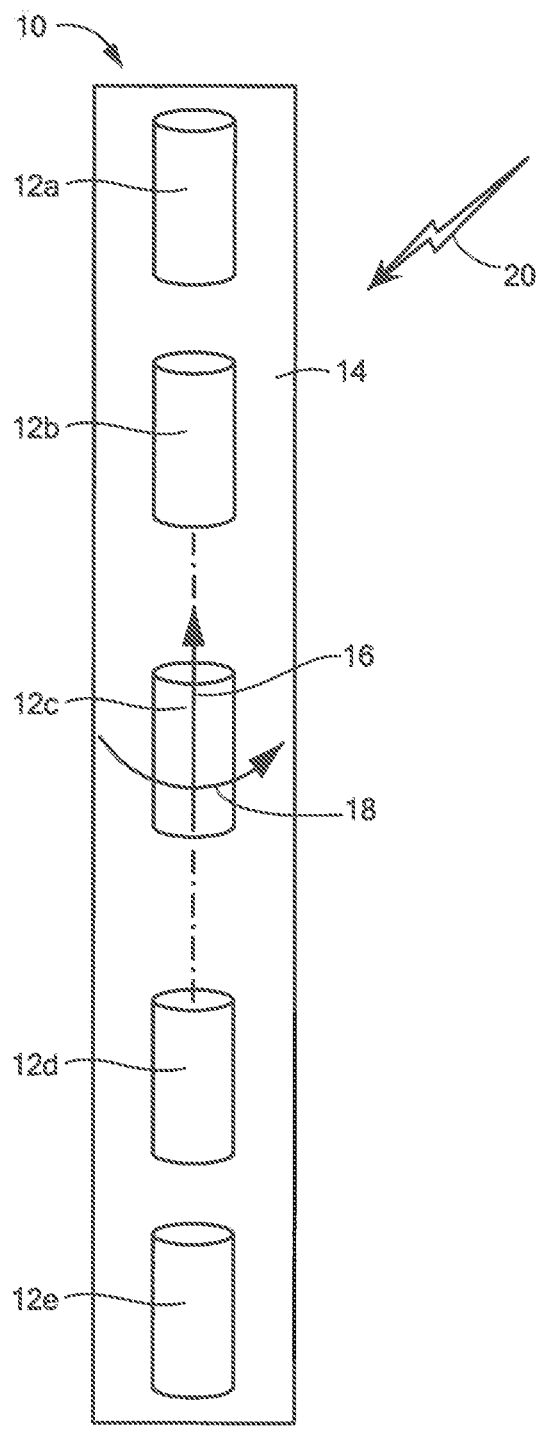
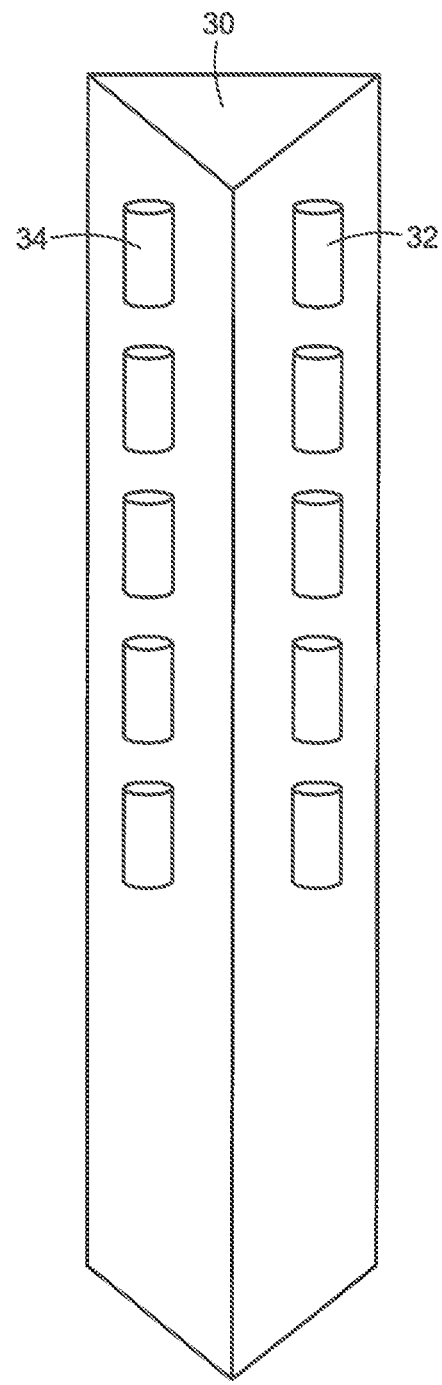
FIG. 1
FIG. 2

MULTI-POLARIZATION ANTENNA ARRAY FOR SIGNAL DETECTION AND AOA

CROSS REFERENCE TO RELATED APPLICATION

The present application claims the benefit of U.S. Provisional Patent Application No. 61/678,938 filed on Aug. 2, 2012, which is incorporated by reference herein in its entirety.

FIELD

Subject matter disclosed herein relates generally to radio frequency circuits and, more particularly, to techniques and structures for detecting and/or transmitting radio frequency (RF) signals in a surrounding environment.

BACKGROUND

Antenna arrays in the high frequency (HF) range of 2-30 MHz are typically very large in size and may require a large area for implementation. These antenna arrays often make use of large beam antenna elements with one beam per tower and only provide a single polarization. Due to element size, HF arrays can also be very difficult and expensive to install. HF arrays that are designed for azimuth angle-of-arrival (AOA) determination typically use many towers and beams. HF beams may also include, for example, Log Periodics, wire structures, and/or other element types. It is often the case that arrays in the HF frequency range are not capable of scanning in elevation or providing elevation angle-of-arrival (AOA) information. The cost of implementing HF arrays is typically very high due to size, weight, and power (SWAP) issues, as well as the cost of installation. One example of an HF array using beam antennas is the HAARP system in Gakosa, Ak. that is used to perform research related to the ionosphere. The HAARP array includes 180 antennas distributed across about 35 acres, multi-polarization, radiating vertically into the ionosphere, and is not capable of elevation AOA determination.

There is a need for HF array antennas that are smaller, cheaper, and less cumbersome than arrays of the past. There is also a need for HF array antennas that are capable of achieving beam steering and AOA determination is elevation. Further, there is a need for HF array designs that are capable of achieving multiple different polarizations.

SUMMARY

In accordance with one aspect of the concepts, systems, circuits, and techniques described herein, a radio frequency (RF) antenna comprises an array of impulse sensors to detect RF signals within a predetermined frequency range propagating in a surrounding environment, the array of impulse sensors arranged in a fixed configuration to provide multiple different polarizations and having at least one B-dot sensor or at least one D-dot sensor. In some embodiments, the array of impulse sensors may be mounted on a common support structure. In other embodiments, the array of impulse sensors may be conformal or quasi-conformal to the side of a building, tower, airborne platform, or vehicle. The impulse sensors may all be arranged in a common orientation, or different orientations may be used. The individual sensors may each have an output for an axial field component and a radial field component. In some implementations, both B-dot sensors and D-dot sensors may be used within the same antenna. In at least one embodiment, impulse sensors are used that are capable of detecting pulses having rise times of 1 picosecond or less. The RF antenna may, in some implementations, be adapted for use in the frequency range of 2-30 MHz (i.e., the HF band). The RF antenna may also be used as a transmit antenna in some implementations.

In accordance with another aspect of the concepts, systems, circuits, and techniques described herein, a radio frequency (RF) receiver system, comprises: a multi-polarization RF antenna including an array of impulse sensors for use in detecting RF signals in a predetermined frequency range propagating in a surrounding environment, the array of impulse sensors arranged in a fixed configuration to provide multiple different polarizations and having at least one B-dot sensor or at least one D-dot sensor; and a digital processor to process output signals of the array of impulse sensors to detect RF signals propagating in a surrounding environment. The digital processor may be used to determine, for example, an elevation angle of arrival (AOA) of a detected RF signal. In some implementations, time difference of arrival (TDOA) techniques may be used to determine elevation AOA. The digital processor may also be used to determine, for example, azimuth angle of arrival of a detected RF signal. In some embodiments, the digital processor may be configured to detect an RF signal using multiple different polarizations of the multi-polarization RF antenna and to select a resulting signal having a highest signal to noise ratio. In some implementations, direct conversion may be used in the receiver system to convert received signals to baseband. Fiber optics may also be used within the receiver system to reduce noise in the system and to remote the HF Array.

In accordance with a still another aspect of the concepts, systems, circuits, and techniques described herein, a method of using a multi-polarization RF antenna having an array of impulse sensors is provided, the array of impulse sensors including at least one B-dot sensor or at least one D-dot sensor, the method comprising: receiving RF signal energy at each of the sensors of the array; converting signal energy received at some or all of the sensors to a digital baseband format; and processing the digitized signal energy within a digital processor to detect one or more RF signals propagating in a surrounding environment. The processing within the digital processor may include determining an elevation angle-of-arrival (AOA) of an RF signal. In some embodiments, time difference of arrival (TDOA) techniques may be used to determine the elevation AOA. Azimuth angle-of-arrival may also be determined for the RF signal. In some implementations, the signal detection signal-to-noise ratio (SNR) may be enhanced by selecting an antenna polarization that achieves the best SNR.

BRIEF DESCRIPTION OF THE DRAWINGS

The foregoing features may be more fully understood from the following description of the drawings in which:

FIG. 1 is a front view of an HF array antenna having a plurality of impulse sensors having a vertical orientation in accordance with an embodiment;

FIG. 2 is a diagram illustrating a tower having an HF array mounted on each of three sides in accordance with an embodiment;

DETAILED DESCRIPTION

Figure 3:
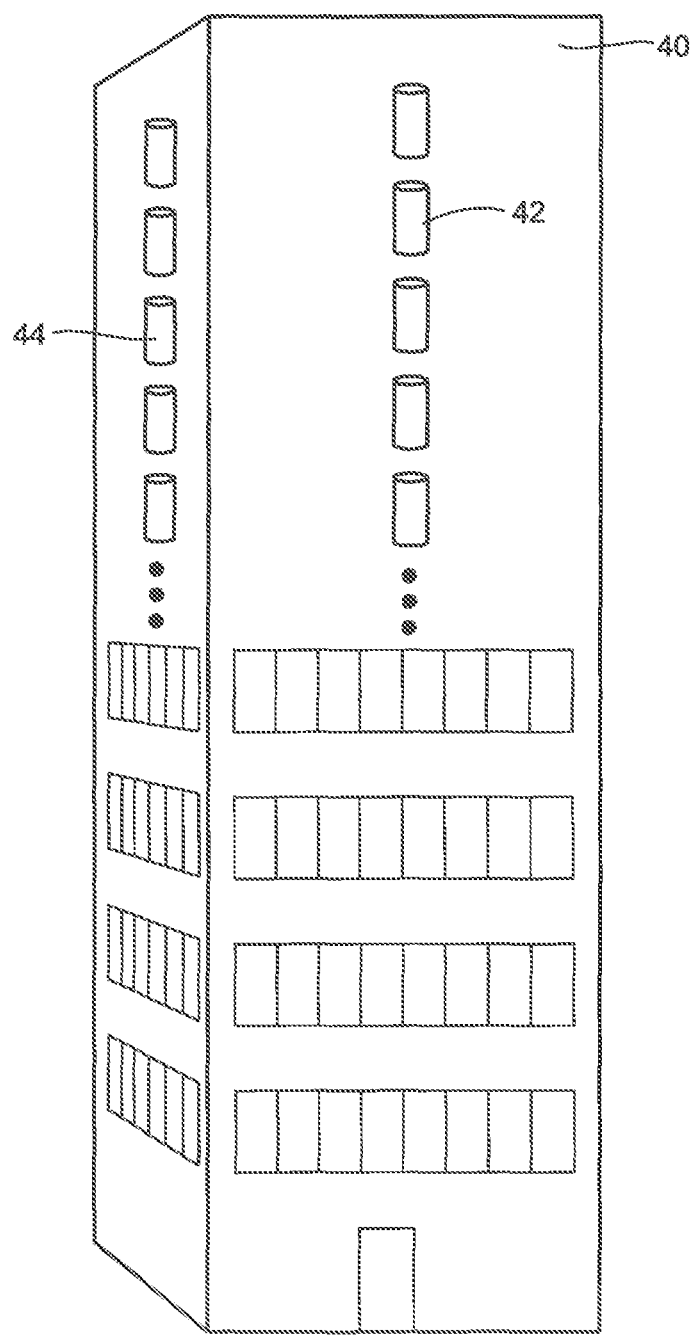
FIG. 3 is a diagram illustrating a building having an HF array mounted on multiple sides thereof in accordance with an embodiment.

In embodiments disclosed herein, antenna arrays are described that make use of fast pulse detection structures and techniques to implement radio frequency (RF) antennas in the HF frequency band (2-30 MHz) and other RF bands. In some implementations, antenna arrays are provided that use sensors that are capable of measuring a time rate of change of electric and/or magnetic fields about the sensors (e.g., D-dot probes, B-dot probes, etc.) as elements of the array. The array antennas described herein can be implemented in a small compact, lightweight form that is capable of being deployed in a conformal or quasi-conformal manner. The fast pulse characteristics of the array elements may provide a very wide instantaneous bandwidth for the array that is capable of covering the HF frequency band and beyond. The elements of the array can be tightly spaced within an area that is a very small fraction of a wavelength. In addition, the antenna arrays described herein may be used to achieve beamforming in elevation to provide elevation angle-of-arrival (AOA) in an HF system or other systems.

In different embodiments, array architectures are provided that are capable of providing polarization in 2, 4, 6, or 12 different polarization vector senses. In addition, multiple polarizations may be provided for both electric field (E) and magnetic field (H) in some implementations. The antenna systems described herein are easy to erect and/or install and may be located in regions, or be conformal to structures, where it was not previously possible to implement HF antennas. The antenna systems described herein are capable of being implemented using low cost commercial off-the-shelf (COTS) components (although fully custom designs are also possible). This is in contrast to conventional HF antenna systems that typically use very large custom HF beam or antenna elements.

In the discussion that follows, novel antenna structures are described for use in the HF frequency hand. It should be appreciated, however, that the different antenna architectures, configurations, and techniques described may also be used in other frequency bands due to the high bandwidth nature of the components involved.

As described above, in various embodiments, antenna arrays may be implemented using D-dot probes and/or B-dot probes. As is known in the art, D-dot probes are compact sensors that are capable of measuring the time rate of change of electric displacement (D), or displacement current, flowing through the probe. More specifically, the voltage across a D-dot probe may be expressed as:

$$V = A \times \dot{D} = A \times dD/dt$$

where V is the output voltage and A is the equivalent area of the probe. The electric displacement D is related to the electric field as follows:

$$D = \text{Electric Displacement} = \epsilon E$$

where $\epsilon$ is the electrical permittivity of the corresponding material and E is the electric field. Similarly, B-dot probes are compact sensors that are capable of measuring the time rate of change of a magnetic field flowing through the probe. More specifically, the voltage across a B-dot probe may be expressed as:

$$V = A \times \dot{B} = A \times dB/dt$$

where V is the output voltage, A is the equivalent area of the probe, and B is the magnetic induction. The magnetic induction (B) is related to magnetic field (H) as follows:

$$B = \text{Magnetic Induction} = \mu H$$

where $\mu$ is the permeability of the corresponding material. In general, B-dot sensors may be configured so that all effects of electric fields will be canceled within the sensor. Similarly, D-dot sensors may be configured so that the effects of magnetic fields will be canceled in the sensor. D-dot probes and B-dot probes are often used in applications that require the detection (or emission) of very fast impulse type waveforms. D-dot probes and B-dot probes are thus considered to be a form of impulse sensor. As such, the sensors are capable of very wide bandwidth operation. Common applications for these types of sensors include, for example, EMI testing, high speed pulse detection systems, high speed pulse waveform verification, high speed pulse measurement and testing, and high speed pulse source test measurement and verification, to name a few.

D-dot probes and B-dot probes are typically much smaller than a wavelength at HF frequencies and, therefore, exhibit low radiation efficiency and low spectral efficiency at these frequencies. These types of sensors often operate by detecting currents induced on structures that the sensors are mounted upon. In some implementations, other types of impulse sensors may be used in an RF array antenna including, for example, coaxial cavity elements (see, e.g., U.S. Pat. No. 6,356,241 to Jaeger et al.) and/or other elements capable of wide instantaneous bandwidths. In some embodiments, impulse sensors are used that are designed for use with pulses having rise times at or below, for example, 1 picosecond. This translates to an instantaneous bandwidth of greater than 5 GHz. Examples of B-dot sensors that may be used in different embodiments include the MGL-S8(R) B-Dot Sensor developed in conjunction with the Air Force Weapons Laboratory (AFWL-TR-75-252) and the Prodyn Model B-10 B-Dot sensor, both of which use conducting cylinders with multiple gaps to sense magnetic fields. The Model B-10, for example, uses a cylinder with four equally spaced longitudinal gaps. The voltage developed across each gap is carried on pairs of 200 Ohm transmission lines, which at opposite gaps are connected in parallel to 100 Ohm cables. The 100 Ohm cables are connected to a 100 Ohm twinax output cable. The B-10 is effectively a half-turn loop driving the output connector. Any responses to electric fields within the B-10 are cancelled due to the gap and wiring structure of the unit. That is, the output signal of the sensor will result from magnetic fields only. Equivalent D-dot sensors also exist. It should be appreciated, however, that a wide variety of other B-dots and D-dots may alternatively be used in other implementations.

In some embodiments, the D-dot probes and/or B-dot probes that are used within an RF array antenna are capable of detecting fields with two different polarizations. For example, the probes may be configured to detect both radial fields and axial fields. In this manner, two different polarizations may be detectable using probes arranged in a single orientation. In some embodiments, additional polarizations may also be achieved by using probes in different orientations or different types of probes (e.g., by interleaving D-dot probes and B-dot probes, etc.). In some implementations, as will be described in greater detail, the signal detection signal-to-noise ratio (SNR) may be enhanced by selecting a polarization that achieves the best SNR.

FIG. 1 is a front view of an HF array antenna 10 having a plurality of impulse sensors 12a-12e in accordance with an implementation. The sensors 12a-12e of array 10 may be either B-dot sensors or D-dot sensors. HF array antenna 10 may be used as a receive antenna and/or a transmit antenna at HF frequencies. As shown, the sensors 12a-12e of antenna 10 are arranged in a linear configuration (i.e., a linear array) in the illustrated embodiment. Note, however, that the array elements can be arranged in any arbitrary configuration in other implementations as a potential for multiple installations. Although illustrated with five sensors in FIG. 1, it should be appreciated that any number of sensors (greater than one) may be used in different implementations. The sensors 12a-12e may be mounted on an antenna support structure 14 to form a single antenna unit that can be deployed in a region of interest. Alternatively, the sensors 12a-12e may be directly mounted onto a larger structure or vehicle (e.g., a tower, a pole, a building, an aircraft, a ship, a ground vehicle, etc.) in a predetermined configuration to perform a desired function.

Each of the sensors 12a-12e of HF antenna array 10 may be capable of sensing fields (electric or magnetic) in both an axial direction 16 and a radial direction 18. If so, HF array antenna 10 may be a multi-polarization antenna. As shown in FIG. 1, all of the sensors 12a-12e in antenna 10 have the same orientation. That is, the sensors 12a-12e are all vertically aligned along corresponding vertical axes. Thus, antenna 10 has two different polarizations (axial and radial). Antenna 10 is capable of sensing propagating HF signals from any of a variety of different directions. In some implementations, antenna 10 and its associated receive circuitry may be configured to determine angle-of-arrival (AOA) information for a received signal 20 by measuring, for example, a time difference of arrival (TDOA) of signal energy at different sensors 12a-12e in the array.

The sensors 12a-12e of HF array antenna 10 may be relatively small in size. For example, a single MGL-S8 B-dot sensor may be on the order of 1" square. A typical Prodyne B-10 sensor may include a cylinder that is approximately 36 inches long and 12 inches in diameter. For HF applications, these are small dimensions. In addition, unlike conventional phased array antennas, the spacing between adjacent sensors in antenna 10 may be significantly less than a wavelength at the frequency of operation of the array. Thus, the sensors 12a-12e of antenna 10 may be arranged in a relatively compact manner. For these and other reasons, HF array antenna 10 can be implemented in a significantly smaller area then HF arrays of the past. In addition to reduced size, antenna 10 may also be significantly lighter and more portable than HF arrays of the past, thereby reducing transportation and installation costs significantly. Because antenna 10 has a number of elements arranged in a vertical line, it may be used to provide AOA in elevation, unlike HF arrays of the past winch were limited to one element per tower.

As described above, in some implementations, array antenna 10 may be implemented as a conformal or quasi-conformal array on the exterior of a structure or vehicle. In addition, in some embodiments, a number of array antennas 10 may be provided around the circumference of a structure or building to provide direction finding capability in azimuth. For example, FIG. 2 illustrates a tower 30 having an array of impulse sensors 32, 34 mounted on each of three sides of the tower 30 in accordance wife an embodiment. The arrays 32, 34 on each side of the tower 30 may each cover a 120 degree azimuth region. AOA in azimuth may therefore be determined using switched beams or in some other manner. Arrays may also be implemented at smaller angular increments in azimuth. For example, in some implementations, arrays of impulse sensors may be implemented at 30 degree intervals around a mounting pole, tower, or other structure. In some embodiments, the coverage regions of the different arrays may overlap in azimuth. In such embodiments, additional processing may be used to determine a more precise azimuth AOA. In some embodiments, two-dimensional arrays of sensors may be used on each face of tower 30 (e.g., two or more adjacent columns of sensors). This may allow direction finding (DF) to be performed within each 120 degree sector to achieve more precise azimuth direction information.

Figure 4:
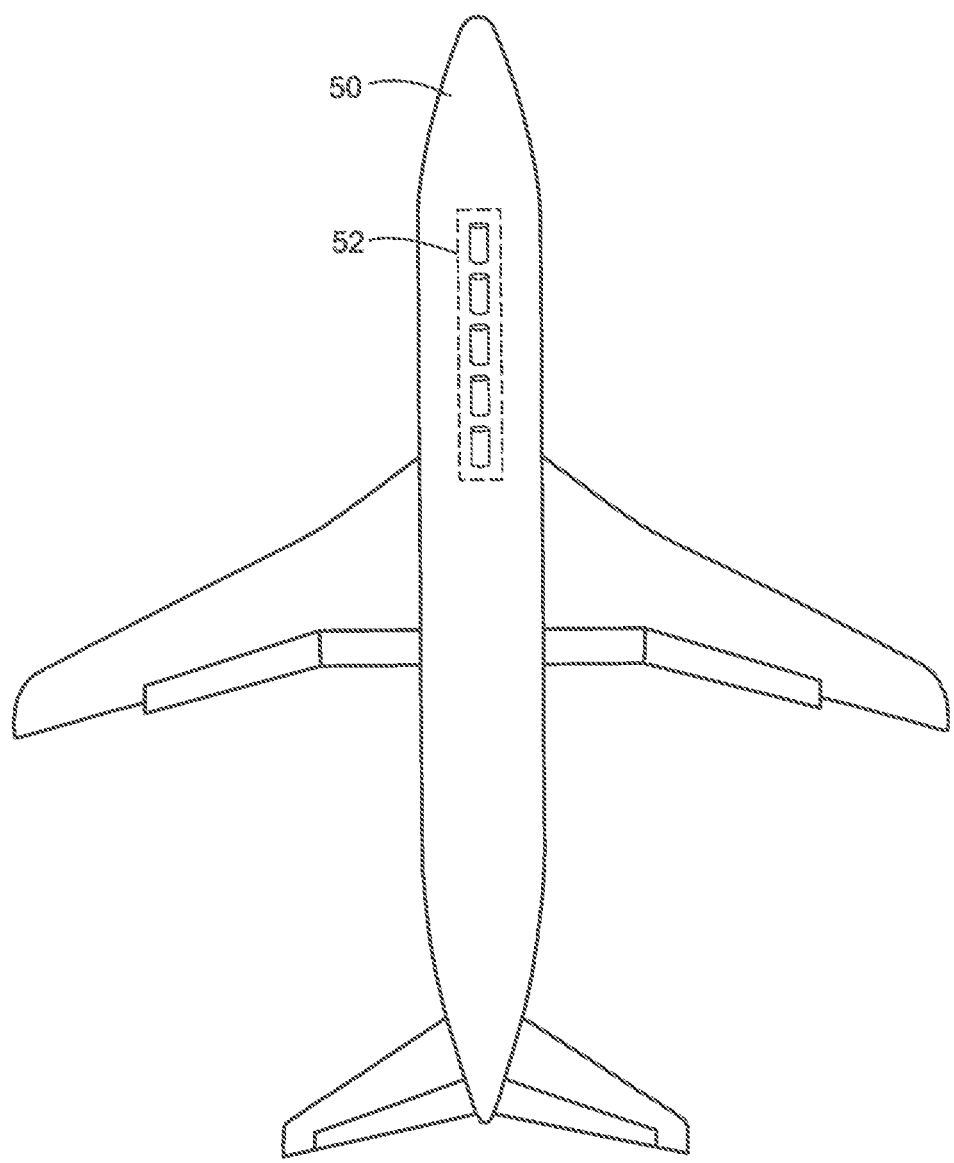
FIG. 4 is a diagram illustrating an aircraft having an HF array mounted on an underside thereof in accordance with an embodiment.

FIG. 3 is a diagram illustrating a building 40 having HF arrays 42, 44 mounted on multiple sides thereof in accordance with an embodiment. As with the embodiment of FIG. 2, some azimuth AOA information may be achieved based on which array on building 40 receives the strongest signal. Two dimensional arrays and/or non-uniformly spaced arrays of sensors may alternatively be used. FIG. 4 illustrates an array of impulse sensors 52 mounted on the underside of an aircraft 50 in accordance with an embodiment. In some implementations, an array may alternatively, or additionally, be mounted on the top and/or sides of aircraft 50 (or all around an external periphery of the aircraft). As will be appreciated, antenna structures described herein can also be mounted in other locations, including on other types of structures or other types of vehicles.

Figure 5:
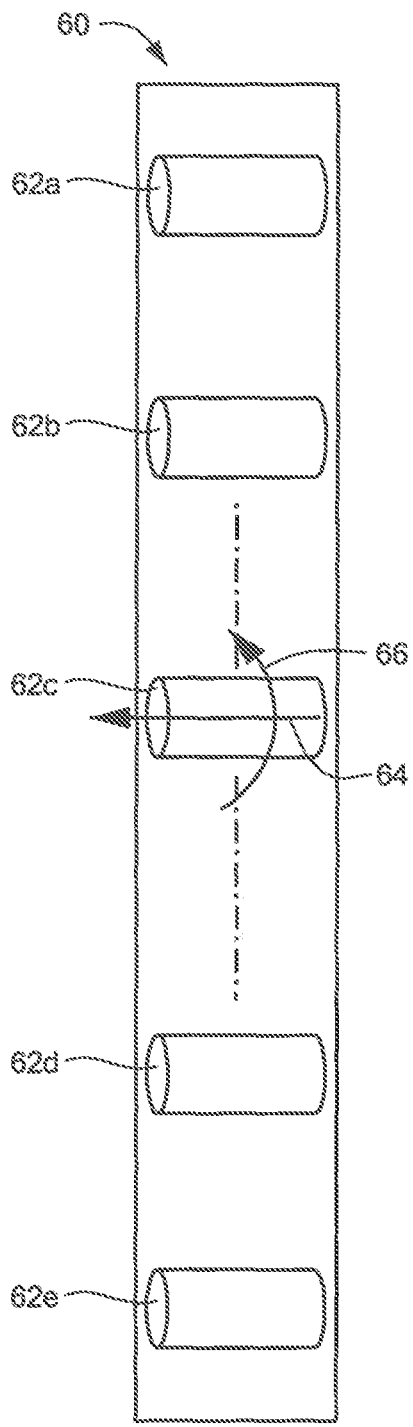
FIG. 5 is a front view of an HF antenna array having a plurality of impulse sensors in a horizontal orientation in accordance with as embodiment.
Figure 6:
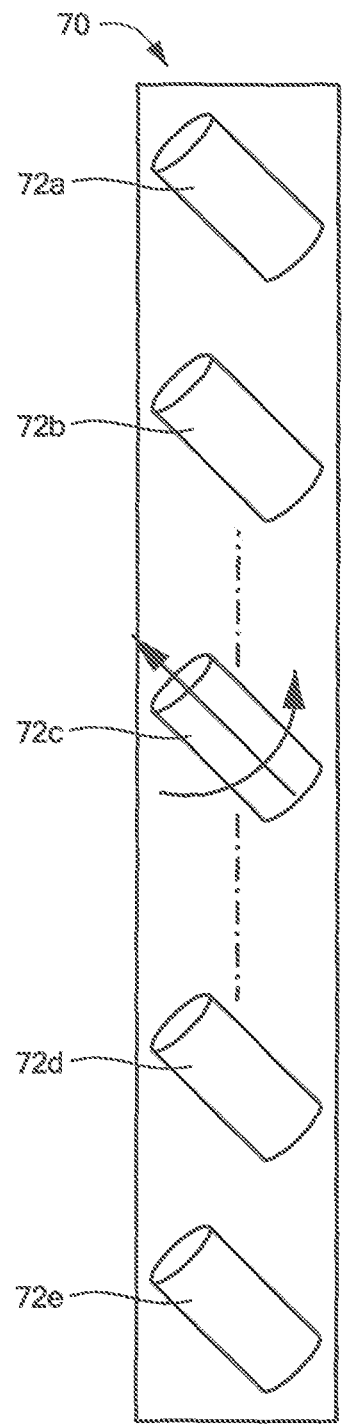
FIG. 6 is a front view of an HF antenna array having a plurality of impulse sensors in a 45-degree orientation in accordance with an embodiment.

FIG. 5 is a front view of an HF array antenna 60 having a plurality of impulse sensors 62a-62e in a horizontal orientation in accordance with an implementation. As before, the sensors 62a-62e of antenna 60 may be either B-dot sensors or D-dot sensors. Array antenna 60 of FIG. 5 is similar to antenna 10 of FIG. 1, except that each of the sensors 62a-62e are mounted in a 90 degree orientation with respect to the centerline of the array (i.e., horizontally), instead of being axially aligned with the centerline. Each of the sensors 62a-62e may be capable of sensing fields in both an axial direction 64 and a radial direction 66. In this manner, HF array antenna 60 may be used as a multi-polarization antenna. As with antenna 10 of FIG. 1, antenna 60 of FIG. 5 may be used to provide AOA in elevation. FIG. 6 illustrates an HF array antenna 70 having a plurality of sensors 72a-72e mounted in a 45 degree orientation with respect to a centerline of the array. As will be appreciated, other sensor orientations may alternatively be used.

Figure 7:
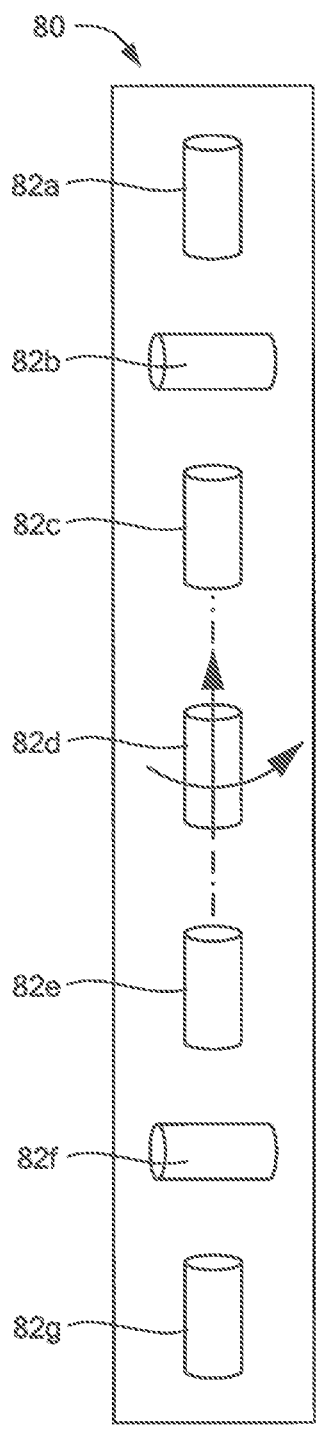
FIG. 7 is a front view of an HF antenna array having a plurality of impulse sensors in two different orientations in accordance with an embodiment.
Figure 8:
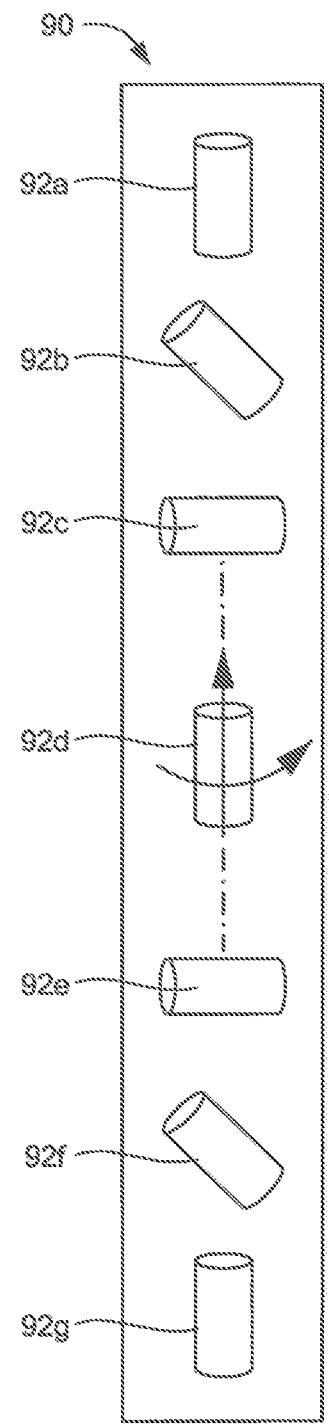
FIG. 8 is a front view of an HF antenna array having a plurality of impulse sensors in three different orientations in accordance with an embodiment.

In the embodiments described above, all of the sensors within the various arrays were oriented in the same direction. Thus, these arrays are each capable of sensing two polarization vectors when the individual sensors are capable of sensing both axial and radial fields. In some embodiments, however, different sensors may be oriented in different directions within an array to achieve greater than two polarization vector senses within an HF array antenna. For example, FIG. 7 is a front view of an array antenna 80 having a plurality of sensors 82a-82g that alternate between zero degree and 90 degree orientations in accordance with an embodiment. As before, each of the sensors 82a-82g may be capable of sensing both axial and radial field components. Thus, the antenna array 80 is capable of achieving 4 different vector senses. In some implementations, three or more sensor orientations may be used to achieve an even greater number of vectors. For example, FIG. 8 is a front view of an array antenna 90 having a plurality of sensors 92a-92g at three different orientations (0, 45, and 90 degrees) in accordance with an implementation. Array 90 is capable of achieving 6 different vector senses.

Figure 9:
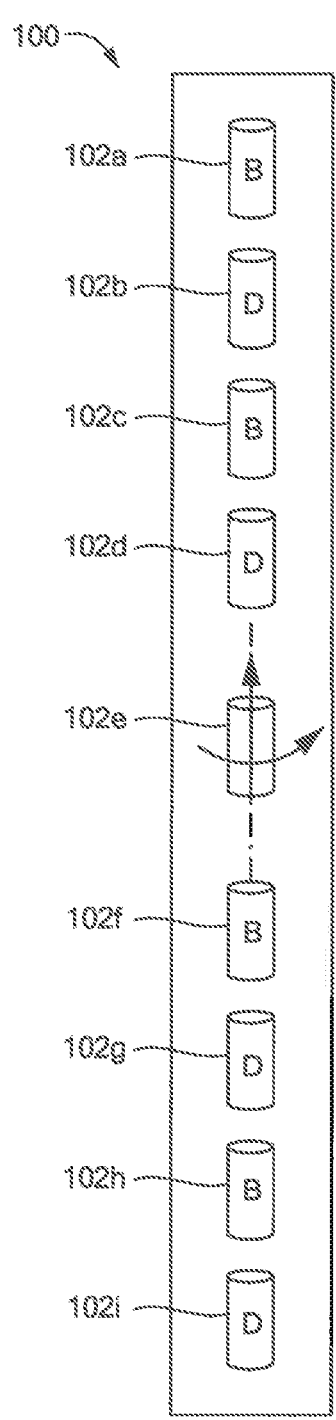
FIG. 9 is a front view of an HF antenna array having two different kinds of impulse sensors in accordance with an embodiment.
Figure 10:
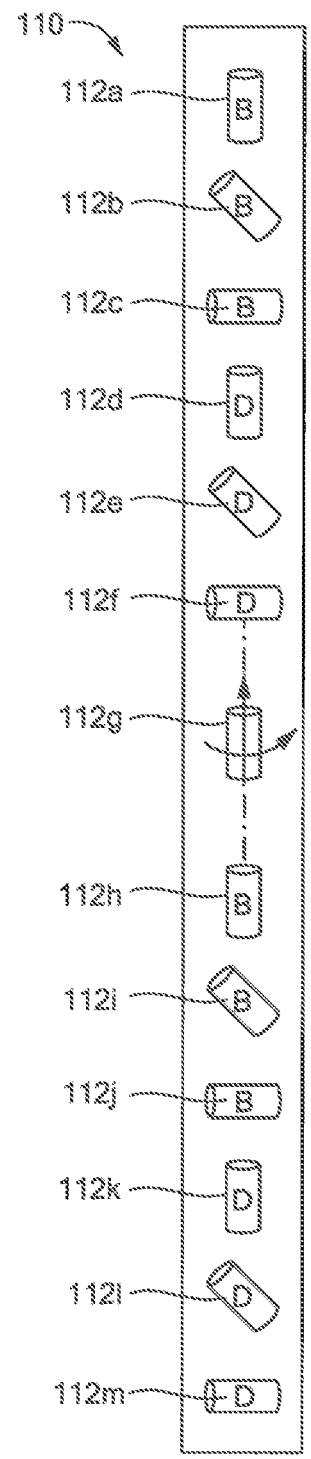
FIG. 10 is a front view of an HF antenna array having two different kinds of impulse sensors in multiple different orientations in accordance with an embodiment.

In some implementations, different types of sensors (e.g., B-dot sensors and D-dot sensors, etc.) may be used within the same array. For example, FIG. 9 is a front view of an HF array antenna 100 having a plurality of sensors 102a-102i that alternate between B-dot sensors and D-dot sensors. Array antenna 100 is capable of achieving four different vector senses (i.e., two vectors using the B-dot sensors and 2 vectors using the D-dot sensors). In some implementations, B-dot sensors and D-dot sensors within an array may be arranged in different orientations to support the generation of additional vector senses. FIG. 10 is a front view of an array antenna 110 having a plurality of sensors 102a-102i that alternate between B-dot sensors and D-dot sensors at different orientations (0, 45, and 90 degrees). Array 110 is capable of achieving twelve different vector senses (six vectors using the B-dot sensors and 6 vectors using the D-dot sensors).

Antenna systems described herein may be used in many different applications at HF frequencies and/or in other frequency bands. For example, in one application, an array antenna may be provided for use in an HF Geolocation (HFGeo) system, such as the one being developed by IARPA (Intelligence Advanced Research Projects Activity). The HFGeo program seeks to develop systems that are capable of geolocating and characterizing HF transmitters from CONUS. As such, the system requires antenna systems that are able to determine AOA and polarization states of received HF signals. Other possible applications include, for example, interferometers, direction finders, HF communications links, HF elevation beam control, polarimeters, warning receiver systems, low power signal of interest (SOI) detection, and/or other applications.

In some of the antenna arrays described above, one dimensional arrays of sensors are used. It should be appreciated, however, that any of these antenna arrays may be modified to include two dimensional arrays of uniform or non-uniformly spaced sensors. In this manner, an enhanced level of direction finding capability may be achieved. In some implementations, different types of sensors may be used in different columns of an array (e.g., B-dot sensors in one column and D-dot sensors in an adjacent column, etc.). Different sensor orientations may also be used in two dimensional arrays.

In the above described embodiments, the sensors of the various antenna arrays are arranged in a linear fashion. In other embodiments, however, non-linear arrangements may be used. For example, in one possible approach, a staggered sensor arrangement may be used. That is, sensors may be alternately positioned on two different sides of a center line. In one implementation, a staggered arrangement may be used where different types of sensors are placed on opposite sides of a center line (e.g., B-dot sensors on one side and D-dot sensors on the other). Different sensor orientations may additionally be used within these embodiments to achieve a larger number of vectors. Other types of non-linear sensor arrangements may also be used.

When used as a receive antenna, signals received by the various sensors of an antenna array will need to be processed to determine AOA (or some other attribute) of a received signal. In some implementations, AOA may be determined in both azimuth and elevation. In some implementations, digital beamforming techniques may be used to determine AOA. Also, in some implementations, TDOA techniques may be used to determine AOA.

Figure 11:
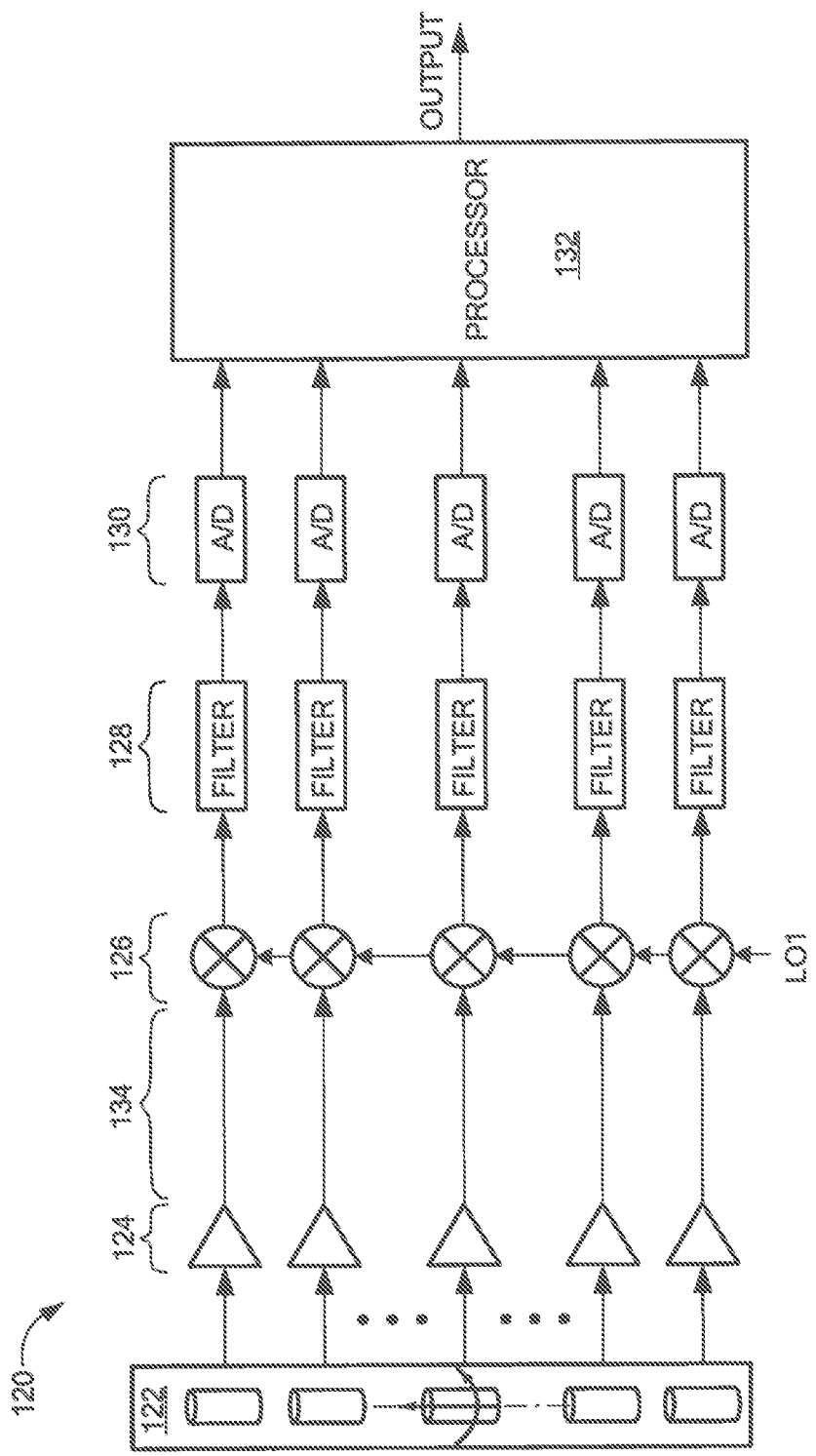
FIG. 11 is a block diagram illustrating an exemplary receiver system for use in processing signals received at sensors of an antenna array in accordance with an embodiment.

FIG. 11 is a block diagram illustrating an exemplary receiver system 120 for use in processing signals received at impulse sensors of an array antenna in accordance with an embodiment. As will be described in greater detail, receiver system 120 is configured to convert a signal received by each of the sensors of an array to baseband. The baseband signal for each sensor may then be digitized and delivered to a digital processor for processing. As illustrated, system 120 includes: an array of sensors 122, a bank of low noise amplifiers (LNAs) 124, a bank of mixers 126, a bank of filters 128, a bank of analog-to-digital (A/D) converters 130, and a processor 132. As described previously, the array of sensors 122 may include B-dot probes, D-dot probes, a combination of B-dot probes and D-dot probes, or some other arrangement of impulse sensors. The B-dot probes and/or D-dot probes may be interleaved within the array 122 and may be in one or more orientations. The B-dot probes and/or D-dot probes may each be configured to sense both an axial field and a radial field.

The bank of LNAs 124 may include one or more LNAs for each of the sensors in array 122. In at least one implementation, the bank of LNAs 124 may include two LNAs for each sensor, one for an axial field component and one for a radial field component output by the sensor. Each LNA in the bank 124 is operative for amplifying a corresponding signal in a low noise manner. Such LNAs are available as COTS at HT frequencies and, therefore, may be relatively inexpensive to acquire. The bank of mixers 126 may, in some implementations, include one mixer for each of the LNAs in bank 124. In at least one implementation, the LNAs 124 may be located at or near the corresponding sensors of array 122 and the output signals of the LNAs 124 may be coupled to the mixers 126 using fiber optic cables 134 (and corresponding modulator/demodulators, not shown) to reduce interference. Fiber optic cables may also be used between the sensors 122 and the LNAs 124 and/or on other locations within receiver system 120.

The mixers in bank 126 may be operative for down converting associated input signals to baseband using a common local oscillator signal (LO1). The bank of filters 128 may be used to filter baseband signals output by mixers 126 to reduce noise within the signals before digitization. The filtered baseband signals may then be applied to A/D converters 130 for conversion to a digital representation. When array 122 is operating at HF frequencies, A/D converters 130 may perform direct sampling on each sensor output, using, for example, 16 or more bits. It is typically desirable that enough bits be used by A/D converters 130 to maintain a relatively high dynamic range. The digitized output signals may be applied to digital processor 132 to be processed. In at least one implementation, digital processor 132 may be configured to perform digital beamforming for the array 122 to determine, for example, an angle-of-arrival (AOA) of a detected signal. Techniques for performing digital beamforming are well known is the art. In some implementations, the phase centers of received signals in different polarizations may not be co-located in the array antenna. However, this may be compensated for in the AOA processing in the digital processor 132 and/or during receiver calibration. In some embodiments, processor 132 may be configured to perform TDOA calculations to determine AOA information.

In some implementations, digital processor 132 may be configured to generate receive signals for various different polarizations A polarization may then be selected that results in a highest signal-to-noise ratio (SNR) in an output signal. Digital processor 132 may also be configured to perform other application-specific forms of processing including, for example, space-time adaptive processing (STAP), to provide additional noise reduction and adaptive cancellation. In at least one implementation, array 122 may include multiple different sub-arrays covering different regions (e.g., different azimuth sectors, etc.) and digital processor 132 may be configured to switch beams between the different sub-arrays to facilitate the determination of an AOA for a received signal (e.g., to determine an azimuth AOA, etc.). The output signal of processor 132 may be delivered to one or more other processors to provide further processing for the signals. Digital processor 132 may be implemented using any of a variety of different processor types including, for example, a general purpose microprocessor, a digital signal processor (DSP), a field programmable gate array (FPGA), a reduced instruction set computer (RISC), an application specific integrated circuit (ASIC), a controller, a microcontroller, an embedded controller, a programmable logic array (PLA), a programmable logic device (PLD), and/or others, including combinations of the above.

It should be appreciated that receiver system 120 of FIG. 11 is merely an example of one receiver architecture that may be used in connection with an antenna array in accordance with an embodiment. Many alternative receiver architectures may also be used. For example, in some implementations, multiple frequency conversion stages may be used within a receiver chain. That is, one or more Intermediate-frequency (IF) down conversion stages may be implemented (e.g., a heterodyne or super-heterodyne receiver may be used). In addition, in some implementations, analog beam forming techniques or AOA determination techniques may be used. In other implementations, digital down conversion may be performed within processor 132 rather than, or in addition to, down conversion in an analog mixer. Other variations may also be used.

Figure 12:
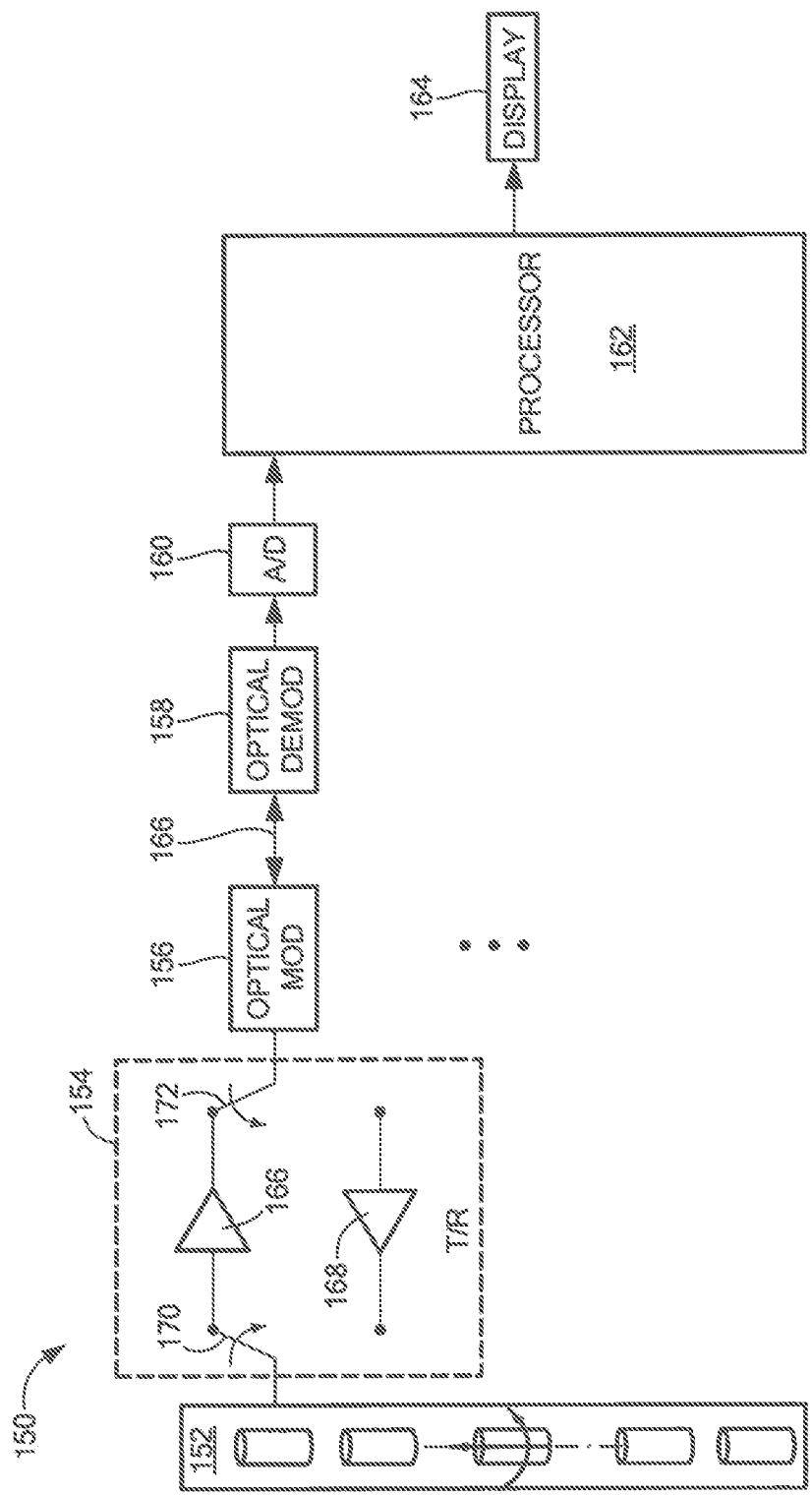
FIG. 12 is a block diagram illustrating an exemplary receiver system that is representative of a direct digitization architecture (DDA) for use in processing signals associated with an array antenna in accordance with an embodiment.

FIG. 12 is a block diagram illustrating an exemplary receiver system 150 that is representative of a direct digitization architecture (DDA) for use in processing signals associated with an array antenna in accordance with an embodiment. For simplicity of illustration, FIG. 12 only shows processing circuitry associated with a single element of an antenna array 152. It should be appreciated, however, that most or all of die elements of array 152 may have similar processing circuitry associated with them in some implementations. As shown, receiver system 150 includes: an array of sensors 152, a transmit/receive module 154, an optical modulator/demodulator 156, an optical fiber 166, an optical demodulator/modulator 158, an analog-to-digital (A/D) converter 160, a processor 162, and a display 164. The array of sensors 152 may be similar to the array 122 of FIG. 11. That is, the array 152 may include B-dot probes, D-dot probes, a combination of B-dot probes and D-dot probes, or some other arrangement of impulse sensors. The transmit/receive module 154 may include a low noise amplifier 166 for use during receive operations and a power amplifier (or RF transmitter) 168 for use during transmit operations. One or more controllable switches 170, 172, or other duplexer structures, may be provided to switch between transmit and receive mode.

Optical fiber 166 may be used as a data transmission structure to carry signals between the array 152 and a remote processor 162. As described previously, the use of optical fiber may be used to reduce noise in the system and to remote the array 152. Optical modulator/demodulator 156 and optical demodulator/modulator 158 may act as interfaces to optical fiber 166. During receive operations, optical modulator/demodulator 156 will act as a light modulator and optical demodulator/modulator 158 will act as a light demodulator. During transmit operations, optical demodulator/modulator 158 will act as a light modulator and optical modulator/demodulator 156 will act as a light demodulator. A/D converter 160 is operative for digitizing analog signals received from optical demodulator/modulator 158 during receive operations. A/D converter 160 may also act as a DAC during transmit operations to convert digital signals from processor 162 to analog form for delivery to optical demodulator/modulator 158. Processor 162 may be similar to processor 132 described above during receive operations. In addition, processor 162 may also be capable of generating digital transmit signals during transmit operations. Processor 162 may former be configured to perform digital transmit beamforming for array 152 daring transmit operations.

Figure 13:
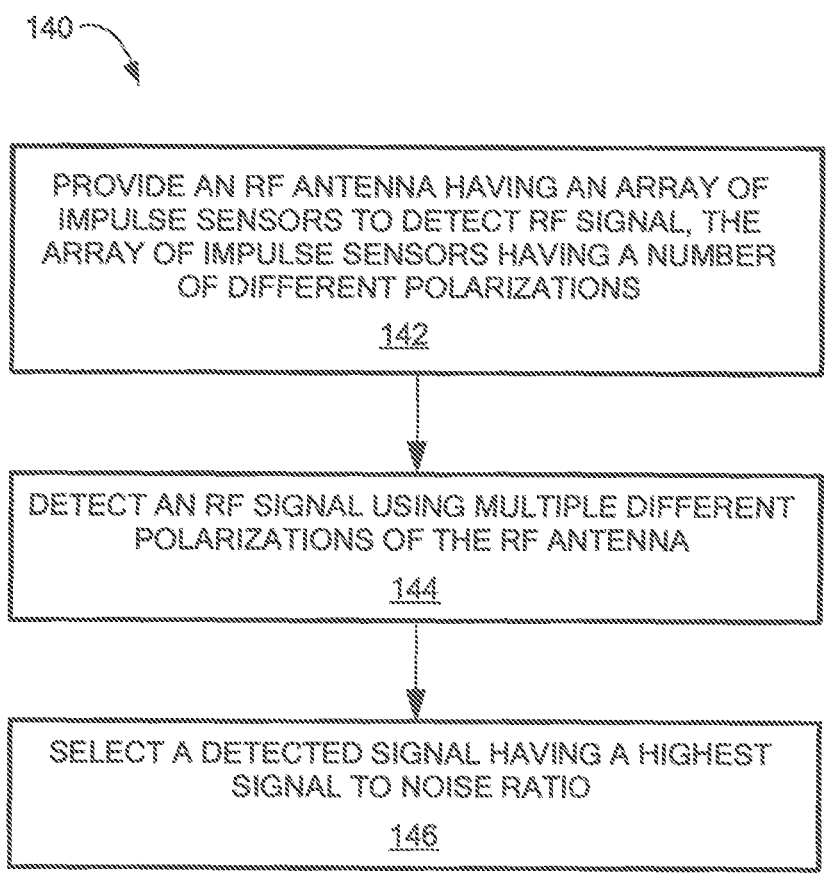
FIG. 13 is a flowchart illustrating a method for detecting an RF signal in accordance with an embodiment.

FIG. 13 is a flowchart Illustrating a method 140 for detecting an RF signal in accordance with an embodiment. An antenna is first provided that includes an array of impulse sensors having a number of different polarizations (block 142). The antenna may be used, for example, within a system that operated within the HF frequency or some other frequency band. The different polarizations of the antenna may be achieved in one or more different ways including, for example, using different types of impulse sensors, using impulse sensors that measure field quantities in multiple different directions (e.g., axial field and radial field, etc.), using impulse sensors that are oriented in multiple different directions, and/or in other manners. In at least one implementation, the array of impulse sensors may include at least one B-dot sensor and/or at least one D-dot sensor.

An RF signal may be detected using multiple different polarizations of the antenna (block 144). For example, a signal received by each of the impulse sensors in the array may first be digitized and the resulting samples delivered to a digital processor. The processor may then use digital beam forming techniques (and/or other techniques) to generate output signals for each of a number of different polarizations. To generate a signal for a particular polarization, the processor may only process signals from impulse sensors (or portions of impulse sensors) that have the corresponding polarization. After signals have been formed for each of the different polarizations, the processor may select a signal having the highest SNR (block 146). This signal may then be further processed, stored, or delivered to a user. Once determined, the signal having the highest SNR may be used to set the processing for AOA in both azimuth and elevation. In an alternative approach, the digitized signals from all of the impulse sensors may be processed together to generate an output signal for the antenna system.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A radio frequency (RF) antenna comprising:
an array of impulse sensors to detect RF signals within a predetermined frequency range propagating in a surrounding environment, the array of impulse sensors arranged in a fixed configuration to provide multiple different polarizations, the array of impulse sensors having a plurality of B-dot sensors and a plurality of D-dot sensors, wherein the sensors are arranged within the array to provide an electric field array interleaved with a magnetic field array.

2. The antenna of claim 1, wherein:
the array of impulse sensors are mounted on a common support structure.

3. The antenna of claim 1, wherein:
the array of impulse sensors are conformal or quasi-conformal to the side of one of: a building, a tower, a vehicle, or an airborne platform.

4. The antenna of claim 1, wherein:
the array of impulse sensors includes the plurality of B-dot sensors or the plurality of D-dot sensors arranged in a common orientation, each of the B-dot sensors or the D-dot sensors having a first output for an axial field component and a second output for a radial field component.

5. The antenna of claim 1, wherein:
the array of impulse sensors includes the plurality of B-dot sensors or the plurality of D-dot sensors arranged in at least two different orientations.

6. The antenna of claim 5, wherein:
the plurality of B-dot sensors or the plurality of D-dot sensors each include a first output for an axial field component and a second output for a radial field component.

7. The antenna of claim 5, wherein:
the array of impulse sensors includes one or more impulse sensors arranged in a first orientation and one or more impulse sensors arranged in a second orientation, the second orientation being orthogonal to the first orientation.

8. The antenna of claim 5, wherein:
the array of impulse sensors includes one or more impulse sensors arranged in a first orientation, one or more impulse sensors arranged in a second orientation, the second orientation being orthogonal to the first orientation, and one or more impulse sensors arranged in a third orientation, the third orientation being different from the first and second orientations.

9. The antenna of claim 1, wherein:
the array of impulse sensors includes a linear array of sensors with the plurality of B-dot sensors and the plurality of D-dot sensors interleaved within the linear array.

10. The antenna of claim 1, wherein:
the plurality of B-dot sensors and the plurality of D-dot sensors are arranged in a common orientation, wherein each of the B-dot sensors and each of the D-dot sensors has a first output for an axial field component and a second output for a radial field component.

11. The antenna of claim 1, wherein:
the plurality of B-dot sensors and the plurality of D-dot sensors are arranged in multiple different orientations.

12. The antenna of claim 11, wherein:
the B-dot sensors are arranged in at least two different orientations and the D-dot sensors are arranged in at least two different orientations.

13. The antenna of claim 11, wherein:
each of the B-dot sensors and each of the D-dot sensors has a first output for an axial field component and a second output for a radial field component.

14. The antenna of claim 1, wherein:
the antenna is configured for use in a frequency range of 3-30 MHz.

15. The antenna of claim 1, wherein:
the impulse sensors in the array of impulse sensors are each capable of detecting pulses having rise times of 1 picosecond or less.

16. The antenna of claim 1, wherein:
the array of impulse sensors is also configured to transmit RF signals within the predetermined frequency range.

17. A radio frequency (RF) receiver system, comprising:
a multi-polarization RF antenna including an array of impulse sensors arranged in a fixed configuration to provide multiple different polarizations, the array of impulse sensors having a plurality of B-dot sensors and a plurality of D-dot sensors, wherein the impulse sensors are arranged to provide an electric field array and a magnetic field array; and
a digital processor to process output signals of the array of impulse sensors to detect RF signals in a predetermined frequency range propagating in a surrounding environment.

18. The RF receiver system of claim 17, wherein:
the digital processor is configured to determine an elevation angle of arrival of a detected RF signal.

19. The RF receiver system of claim 18, wherein:
the digital processor is configured to determine the elevation angle of arrival of the detected RF signal using time difference of arrival (TDOA) techniques.

20. The RF receiver system of claim 18, wherein:
the digital processor is configured to determine an azimuth angle of arrival of the detected RF signal.

21. The RF receiver system of claim 18, wherein:
the digital processor is configured to detect an RF signal using multiple different polarizations of the multi-polarization RF antenna and select a polarization that results in a highest signal to noise ratio.

22. The RF receiver system of claim 18, further comprising:
at least one mixer coupled between a first impulse sensor of the multi-polarization RF antenna and the digital processor to down convert a received RF signal to a baseband representation.

23. The RF receiver system of claim 22, wherein:
the at least one mixer includes a single mixer to provide direct conversion to baseband.

24. The RF receiver system of claim 22, further comprising:
an analog-to-digital (A/D) converter between the at least one mixer and the digital processor to convert the baseband signal to a digital representation.

25. The RF receiver system of claim 22, further comprising:
a low noise amplifier (LNA) coupled between the first impulse sensor and the at least one mixer to amplify received signal energy in a low noise manner; and
a fiber optic cable coupling the LNA to the at least one mixer.

26. The RF receiver system of claim 17, wherein:
the RF receiver system is configured for use in a frequency range of 3-30 MHz.

27. A method of using a multi-polarization RF antenna having an array of impulse sensors, the method comprising:
receiving RF signal energy at each of the sensors of the array, the array having a plurality of B-dot sensors and a plurality of D-dot sensors, and wherein the sensors are arranged within the array to provide an electric field array interleaved with a magnetic field array;
converting signal energy received at one or more of the sensors to a digital baseband format; and
processing the digitized signal energy within a digital processor to detect one or more RF signals in a predetermined frequency range propagating in a surrounding environment.

28. The method of claim 27, wherein:
processing the digitized signal energy within the digital processor includes determining an elevation angle-of-arrival of an RF signal.

29. The method of claim 28, wherein:
determining an elevation angle-of-arrival of an RF signal includes using at least one of time difference of arrival (TDOA) techniques and frequency difference of arrival (FDOA) techniques.

30. The method of claim 28, wherein:
processing the digitized signal energy within the digital processor includes determining an azimuth angle-of-arrival of an RF signal.

31. The method of claim 27, wherein:
processing the digitized signal energy within the digital processor includes detecting an RF signal using different polarizations of the multi-polarization RF antenna and selecting a polarization that results in a highest signal to noise ratio.

* * * * *